(12) United States Patent
Gyoda

(10) Patent No.: US 11,194,137 B2
(45) Date of Patent: Dec. 7, 2021

(54) ZOOM LENS AND IMAGE PICKUP APPARATUS INCLUDING SAME

(71) Applicant: CANON KABUSHIKI KAISHA, Tokyo (JP)

(72) Inventor: Yuichi Gyoda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 341 days.

(21) Appl. No.: 16/135,090

(22) Filed: Sep. 19, 2018

(65) Prior Publication Data

US 2019/0094490 A1 Mar. 28, 2019

(30) Foreign Application Priority Data

Sep. 25, 2017 (JP) .............................. JP2017-183451

(51) Int. Cl.
*G02B 15/14* (2006.01)
*G02B 27/00* (2006.01)

(52) U.S. Cl.
CPC ....... *G02B 15/142* (2019.08); *G02B 15/1425* (2019.08); *G02B 15/144511* (2019.08); *G02B 27/0037* (2013.01)

(58) Field of Classification Search
CPC ................ G02B 15/177; G02B 15/142; G02B 15/1425; G02B 15/144511
USPC .................................................. 359/686, 691
See application file for complete search history.

(56) References Cited

U.S. PATENT DOCUMENTS

| 6,441,967 | B2 * | 8/2002 | Furuta | G02B 15/177 359/680 |
| 8,982,476 | B2 * | 3/2015 | Maetaki | G02B 15/177 359/684 |
| 9,097,881 | B2 * | 8/2015 | Yamagami | G02B 15/142 |
| 9,134,516 | B2 * | 9/2015 | Kimura | G02B 15/142 |
| 9,256,059 | B2 * | 2/2016 | Inoue | H04N 5/23296 |
| 9,291,804 | B2 * | 3/2016 | Inoue | G02B 15/177 |

(Continued)

FOREIGN PATENT DOCUMENTS

| JP | 2014178388 A | 9/2014 |
| JP | 2014225002 A | 12/2014 |

(Continued)

OTHER PUBLICATIONS

Notice of Reasons for Refusal issued by the Japan Patent Office dated Aug. 24, 2021 in corresponding JP Patent Application No. 2017-183451, with English translation.

*Primary Examiner* — Zachary W Wilkes
(74) *Attorney, Agent, or Firm* — Carter, DeLuca & Farrell LLP

(57) ABSTRACT

The zoom lens according to the present invention includes, in order from an object side to an image side, a first lens unit with a negative refractive power and a rear lens group including one or more lens units, in which intervals between adjacent ones of the lens units are changed during zooming and focusing. The first lens unit includes three or more negative lenses. The rear lens group includes a focus lens unit with a negative refractive power that moves during focusing. A focal length of the first lens unit, a shortest focal length of the zoom lens, curvature radii of object-side and image-side lens surfaces of a lens in the first lens unit disposed closest to the object side, and a focal length of the focus lens unit are appropriately set.

11 Claims, 11 Drawing Sheets

(56) References Cited

U.S. PATENT DOCUMENTS

| | | | |
|---|---|---|---|
| 9,406,510 B2 | 8/2016 | Tsujita et al. | |
| 9,684,155 B2 * | 6/2017 | Hatada | G02B 13/06 |
| 9,715,092 B2 * | 7/2017 | Inomoto | G02B 13/06 |
| 9,897,788 B2 | 2/2018 | Gyoda | |
| 10,025,075 B2 | 7/2018 | Gyoda | |
| 10,095,012 B2 * | 10/2018 | Yamagami | G02B 13/04 |
| 11,002,948 B2 * | 5/2021 | Koida | G02B 15/144511 |
| 11,042,006 B2 * | 6/2021 | Masugi | G02B 15/144511 |
| 2004/0156119 A1 | 8/2004 | Shibayama | |
| 2007/0047096 A1 | 3/2007 | Ito et al. | |
| 2010/0195216 A1 * | 8/2010 | Miyazaki | G02B 15/177 |
| | | | 359/686 |
| 2012/0013996 A1 | 1/2012 | Okumura | |
| 2014/0002908 A1 * | 1/2014 | Sugita | G02B 13/04 |
| | | | 359/682 |
| 2014/0125858 A1 * | 5/2014 | Sugita | G02B 15/177 |
| | | | 348/345 |
| 2014/0320976 A1 * | 10/2014 | Nakahara | G02B 15/177 |
| | | | 359/680 |
| 2017/0336608 A1 | 11/2017 | Gyoda | |
| 2018/0074300 A1 | 3/2018 | Gyoda et al. | |

FOREIGN PATENT DOCUMENTS

| | | |
|---|---|---|
| JP | 2017068114 A | 4/2017 |
| WO | 2017099244 A1 | 6/2017 |

\* cited by examiner

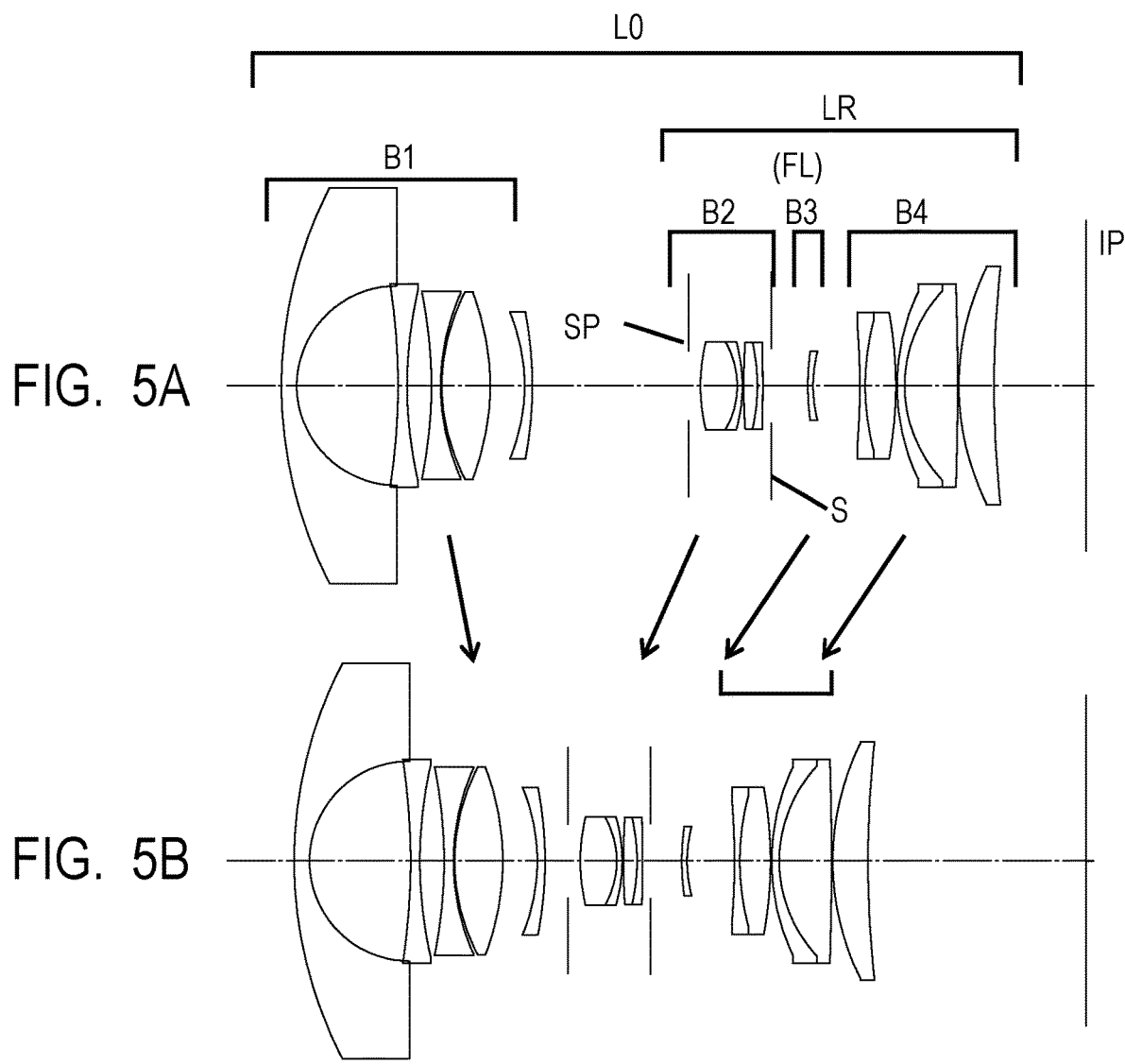

FIG. 10
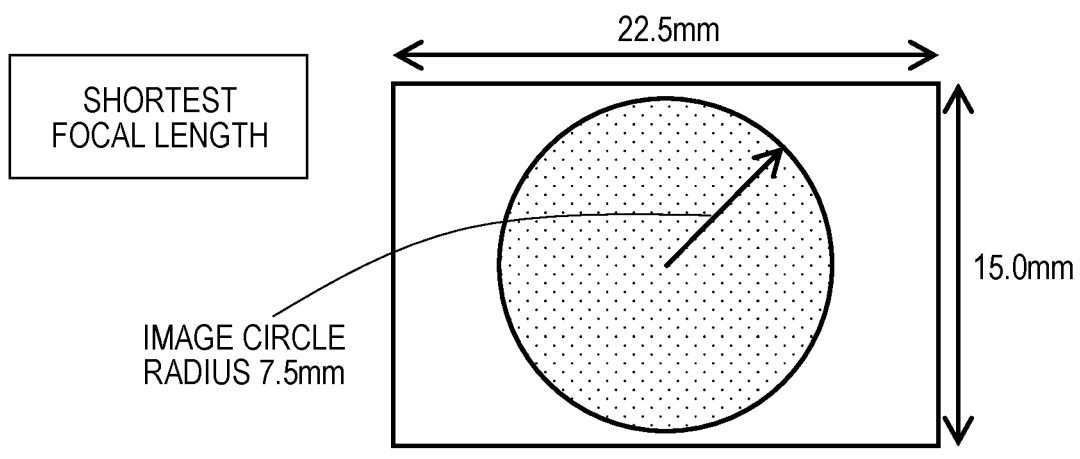
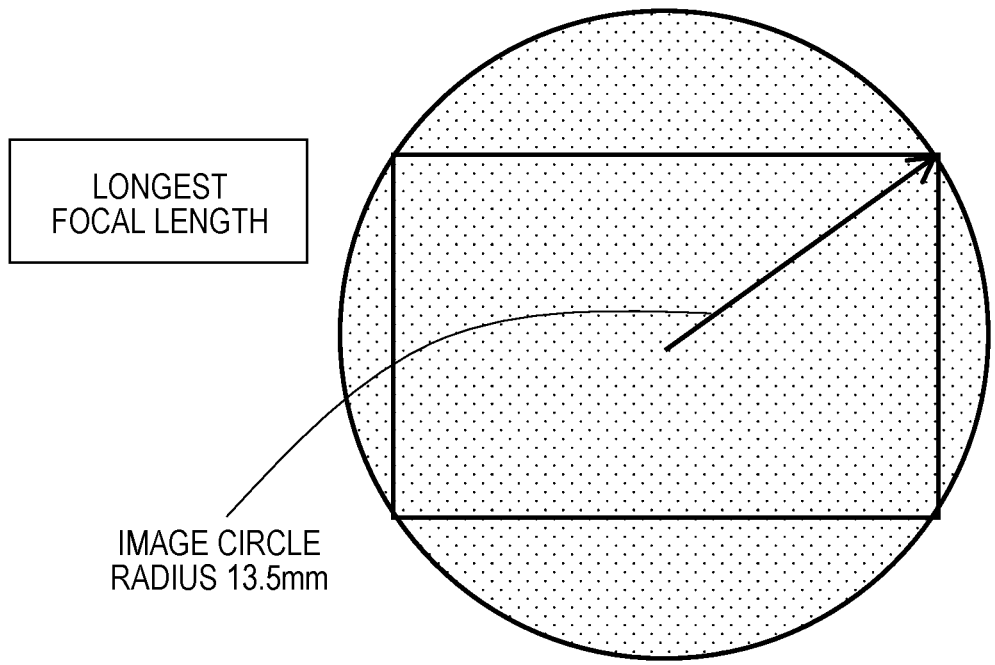

ZOOM LENS AND IMAGE PICKUP APPARATUS INCLUDING SAME

BACKGROUND OF THE INVENTION

Field of the Invention

The present invention relates to a zoom lens and an image pickup apparatus including the same and is preferably used as an image pickup optical system for use in an image pickup apparatus using an image pickup element, such as a digital still camera, a video camera, a surveillance camera, a vehicle-mounted camera, or a broadcast camera.

Description of the Related Art

An image pickup optical system for use in an image pickup apparatus such as a digital still camera is required to be a zoom lens which has good optical performance and has a short total lens length (a short distance from the closest lens surface to the object side to the image plane), so that the whole system is compact. Further, such an image pickup optical system is required to be a zoom lens that allows easy quick focusing, and so on.

As a zoom lens that allows easy quick focusing, an internal focus-type zoom lens has been known, which performs focusing by using a compact and lightweight lens unit on the image side relative to a first lens unit disposed closest to the object side.

Besides the above, a zoom lens for use in a surveillance camera, a vehicle-mounted camera, or the like is required to be a zoom lens with a wide angle of view, e.g. a fisheye zoom lens, with which imaging can be easily performed with a smaller dead angle. As a zoom lens with a wide angle of view, a zoom lens (U.S. Patent Application Publication No. 2012/0013996) has heretofore been known which has, in order from the object side to the image side, a first lens unit with a negative refractive power and a second lens unit with a positive refractive power and has an imaging half angle of view of about 90 degrees at the shortest focal length (wide angle end).

In order for a zoom lens to have a wide angle of view and achieve high optical performance across the entire zoom range and the entire object distance range, it is important to appropriately set the elements constituting the zoom lens. For example, it is important to appropriately set the zoom type (the number of lens units and the refractive power of each lens unit), the lens configuration, and the lens unit selected for focusing, and so on.

If these configurations are not appropriate, achieving a wide angle of view will increase the size of the whole system and also increase the variations of various aberrations caused by zooming and focusing. It will therefore be difficult to achieve high optical performance across the entire zoom range and the entire object distance range.

For example, for a fisheye zoom lens having an imaging half angle of view of 85 degrees or more, a meniscus lens having an extremely strong negative refractive power needs to be disposed closest to the object side within the first lens unit in order to take light rays into the zoom lens from such a wide angle of view. Generally, lenses in a first lens unit not only have strong refractive powers but also have large effective diameters. Thus, when it comes to a fisheye zoom lens, its first lens unit is heavy and large as well. Then, if the entirety or part of the first lens unit (the closest lens unit to the object side) is used as a focus lens unit, quick focusing will be difficult.

An object of the present invention is to provide a zoom lens that allows easy quick focusing with a wide angle of view and can also easily achieve high optical performance across the entire object distance range, and to provide an image pickup apparatus having the zoom lens.

SUMMARY OF THE INVENTION

The zoom lens according to the present invention includes, in order from an object side to an image side, a first lens unit with a negative refractive power and a rear lens group including one or more lens units, in which intervals between adjacent ones of the lens units are changed during zooming and focusing. The first lens unit includes three or more negative lenses. The rear lens group includes a focus lens unit with a negative refractive power that moves during focusing. The zoom lens satisfies the following conditional expressions:

$$0.85 < |f1|/fW < 7.0,$$

$$0.40 < (R1-R2)/(R1+R2) < 0.80, \text{ and}$$

$$2.0 < |fF|/fW < 7.0$$

where f1 represents a focal length of the first lens unit, fW represents a shortest focal length of the zoom lens, R1 and R2 represent curvature radii of object-side and image-side lens surfaces of a lens (G1) in the first lens unit disposed closest to the object side, respectively, and fF represents a focal length of the focus lens unit.

Further features of the present invention will become apparent from the following description of exemplary embodiments with reference to the attached drawings.

BRIEF DESCRIPTION OF THE DRAWINGS

FIG. 5A is a lens cross-sectional view of a zoom lens of Example 3 at the shortest focal length.

FIG. 5B is a lens cross-sectional view of the zoom lens of Example 3 at the longest focal length.

FIG. 10 is an explanatory diagram of the relation in size between an image pickup element and an image circle regarding the zoom lens of Example 1.

DESCRIPTION OF THE EMBODIMENTS

Preferred Examples of the present invention will now be described in detail in accordance with the accompanying drawings.

The best Examples of a zoom lens and an image pickup apparatus having the same according to the present invention will now be discussed. The zoom lens according to the present invention has, in order from the object side to the image side, a first lens unit with a negative refractive power and a rear lens group including one or more lens units and changes the interval between adjacent ones of the lens units during zooming and focusing. The rear lens group has a focus lens unit with a negative refractive power that moves during focusing.

Figures 1A, 1B:
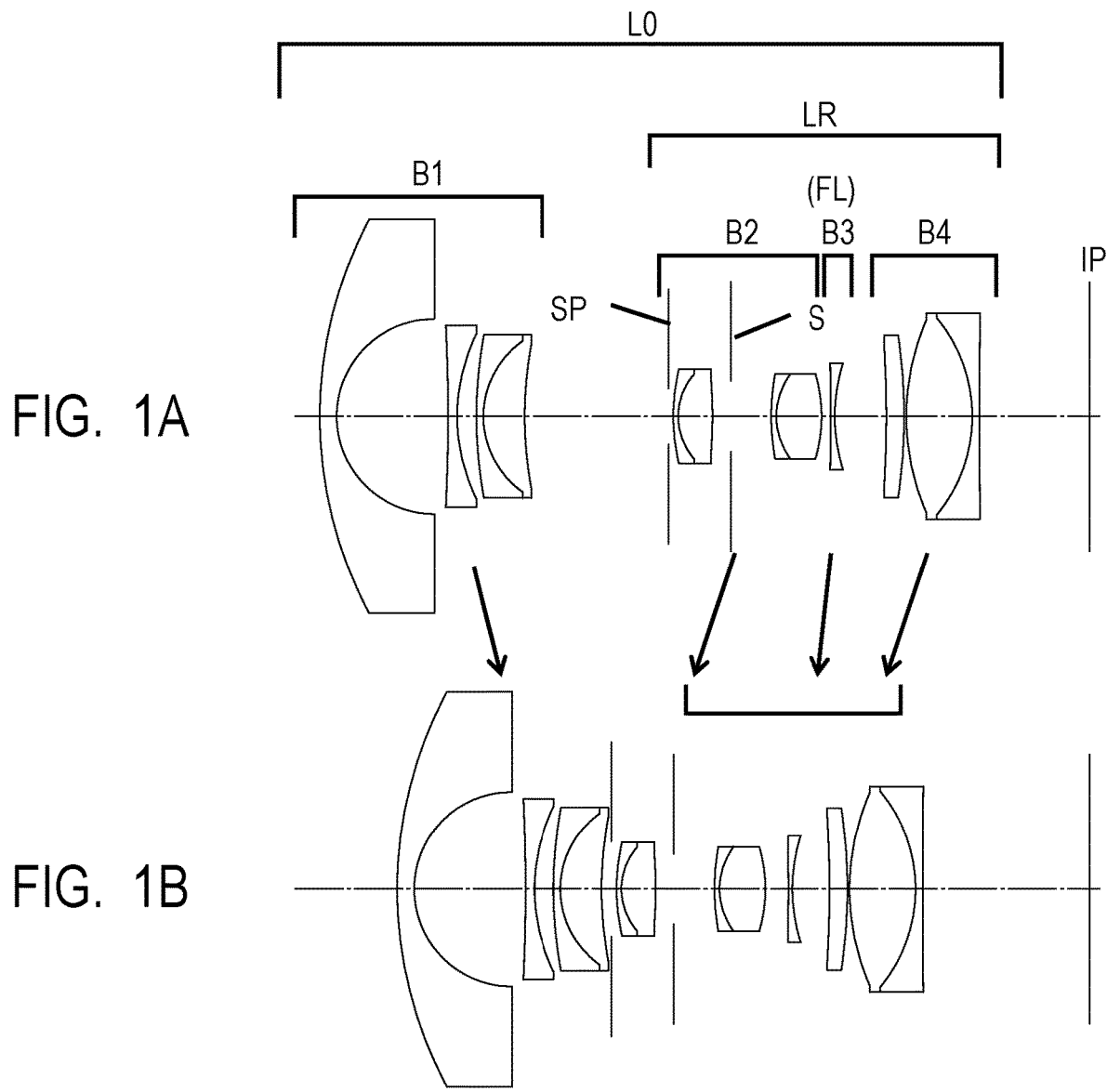
FIG. 1A is a lens cross-sectional view of a zoom lens of Example 1 at the shortest focal length.
FIG. 1B is a lens cross-sectional view of the zoom lens of Example 1 at the longest focal length.
Figure 2A:
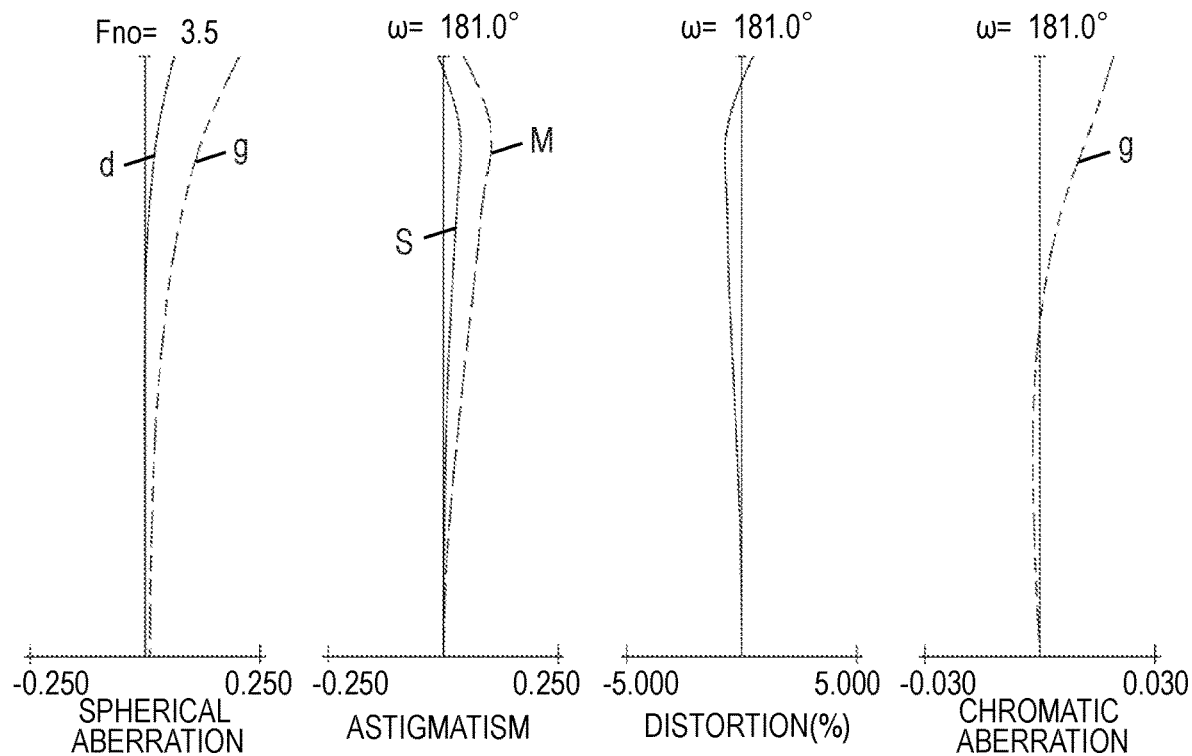
FIG. 2A is a set of aberration diagrams of the zoom lens of Example 1 at the shortest focal length.
Figure 2B:
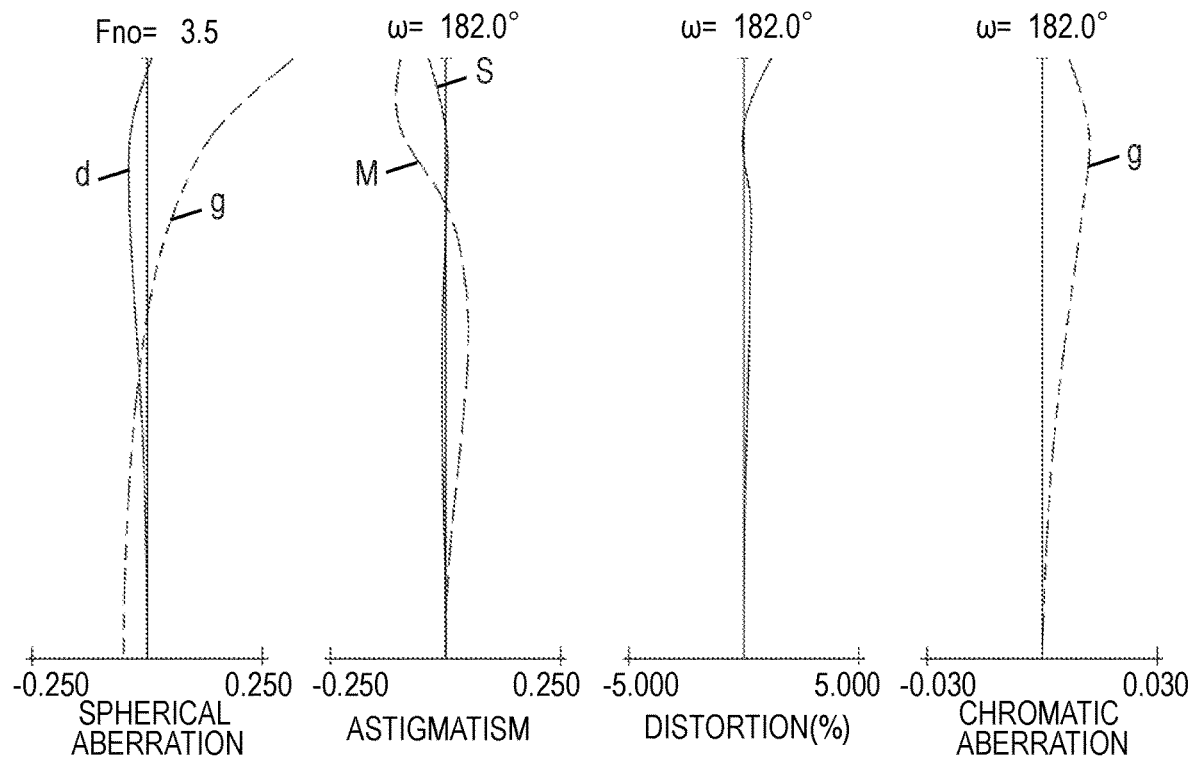
FIG. 2B is a set of aberration diagrams of the zoom lens of Example 1 at the longest focal length.

FIGS. 1A and 1B are lens cross-sectional views of a zoom lens of Example 1 of the present invention at the shortest focal length and the longest focal length, respectively. FIGS. 2A and 2B are sets of aberration diagrams of the zoom lens of Example 1 at the shortest focal length and the longest focal length, respectively. Example 1 represents a zoom lens with a zoom ratio of 1.79 and an F-number of 3.50.

Figure 3A:
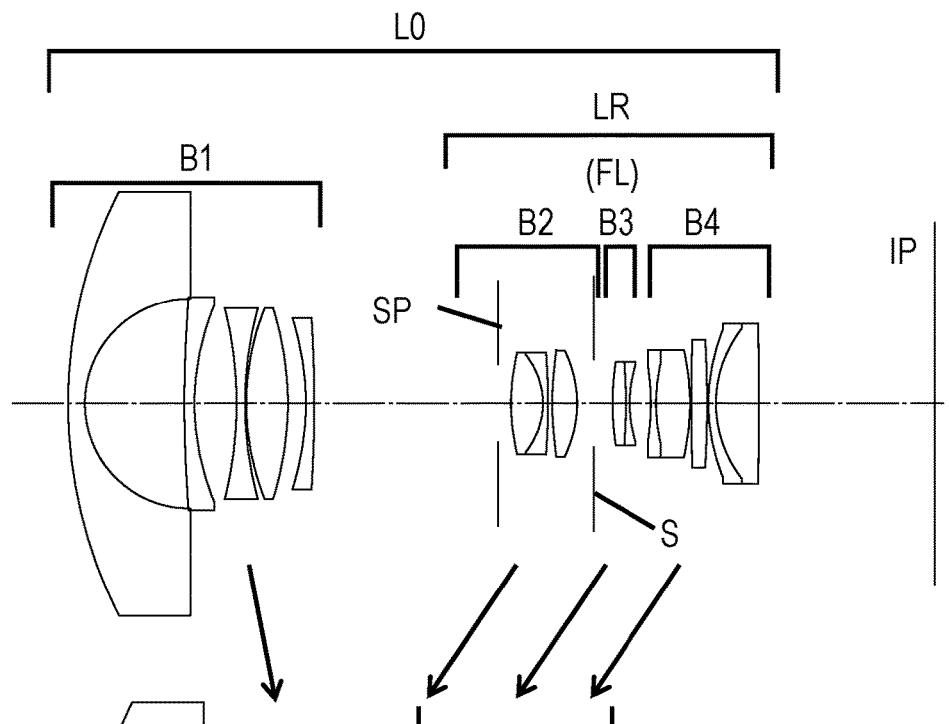
FIG. 3A is a lens cross-sectional view of a zoom lens of Example 2 at the shortest focal length.
Figure 3B:
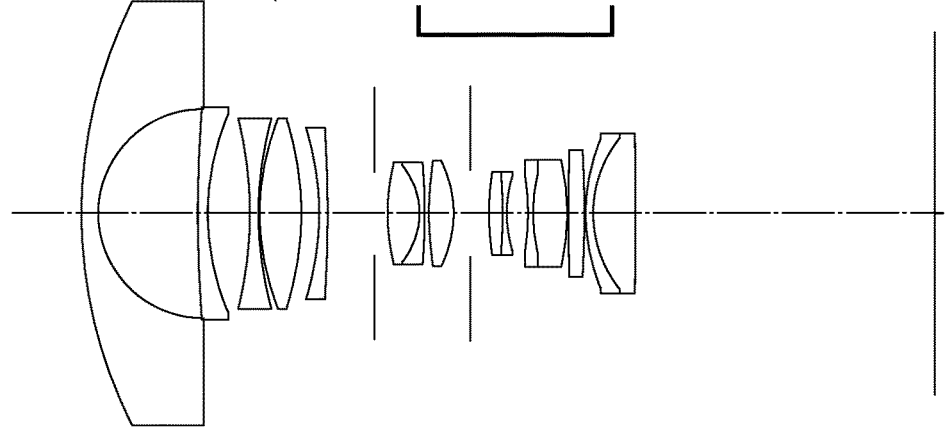
FIG. 3B is a lens cross-sectional view of the zoom lens of Example 2 at the longest focal length.
Figure 4A:
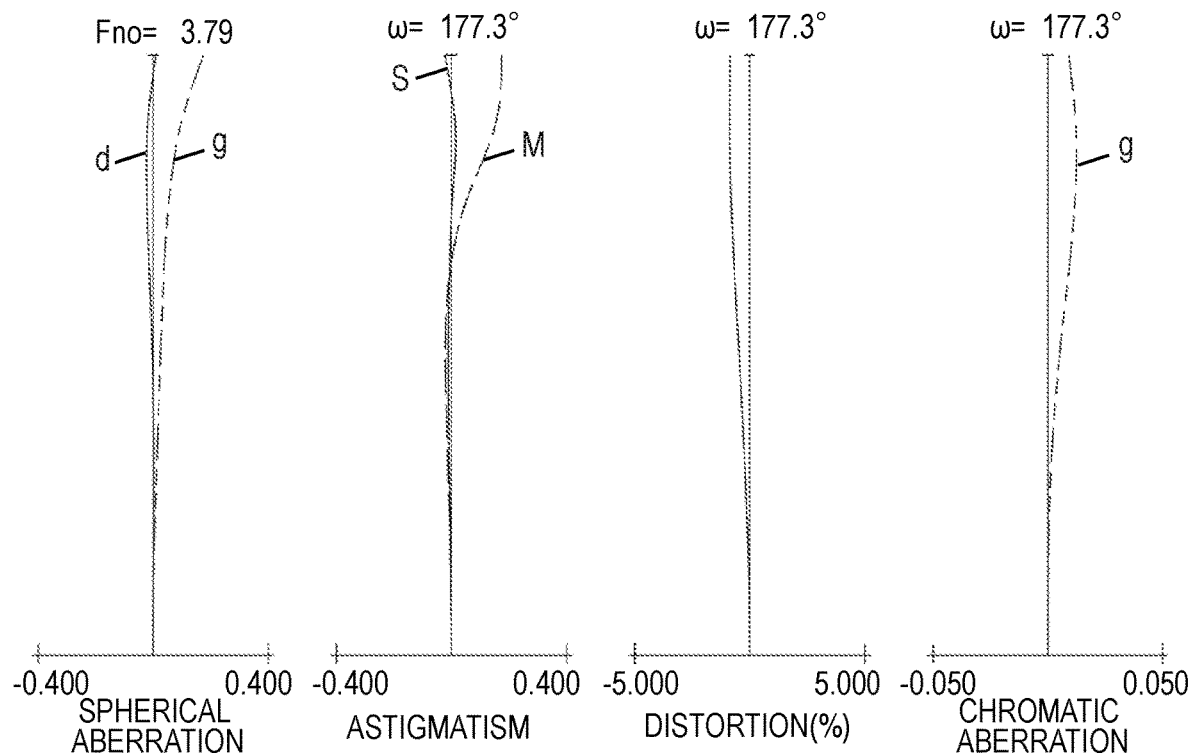
FIG. 4A is a set of aberration diagrams of the zoom lens of Example 2 at the shortest focal length.
Figure 4B:
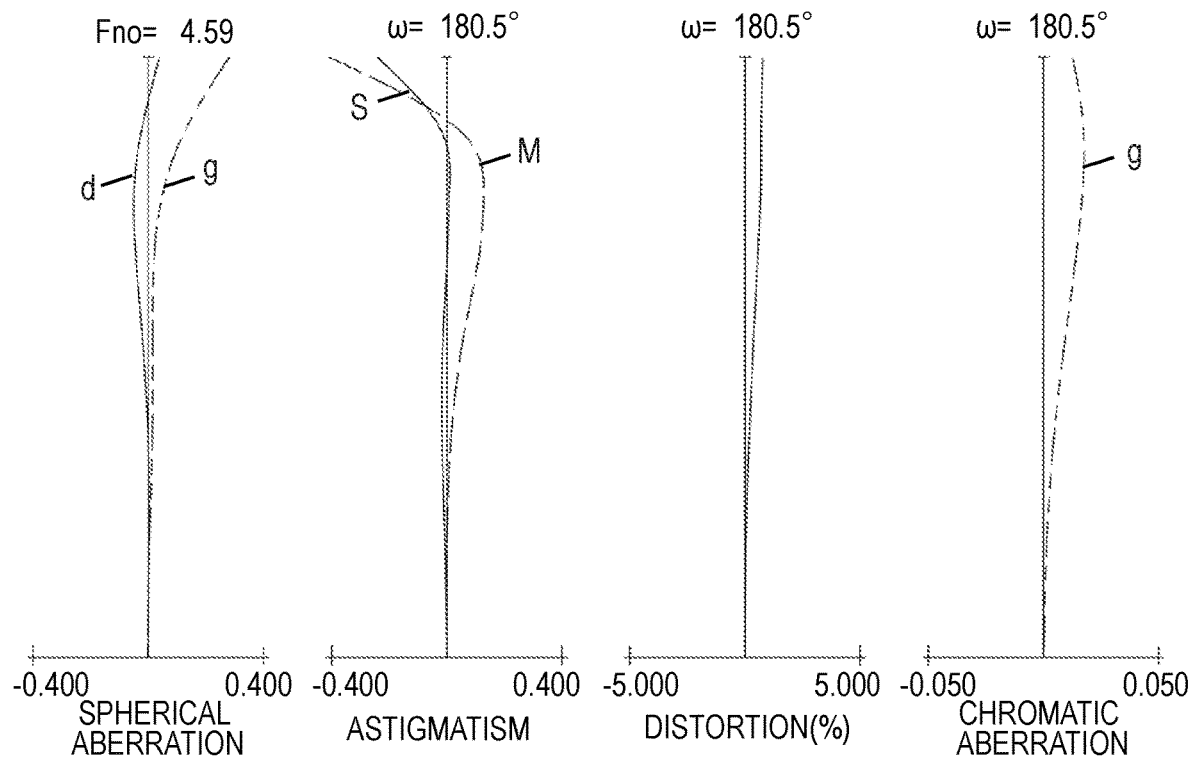
FIG. 4B is a set of aberration diagrams of the zoom lens of Example 2 at the longest focal length.

FIGS. 3A and 3B are lens cross-sectional views of a zoom lens of Example 2 of the present invention at the shortest focal length and the longest focal length, respectively. FIGS. 4A and 4B are sets of aberration diagrams of the zoom lens of Example 2 at the shortest focal length and the longest focal length, respectively. Example 2 represents a zoom lens with a zoom ratio of 1.89 and an F-number of 3.79 to 4.59.

Figure 6A:
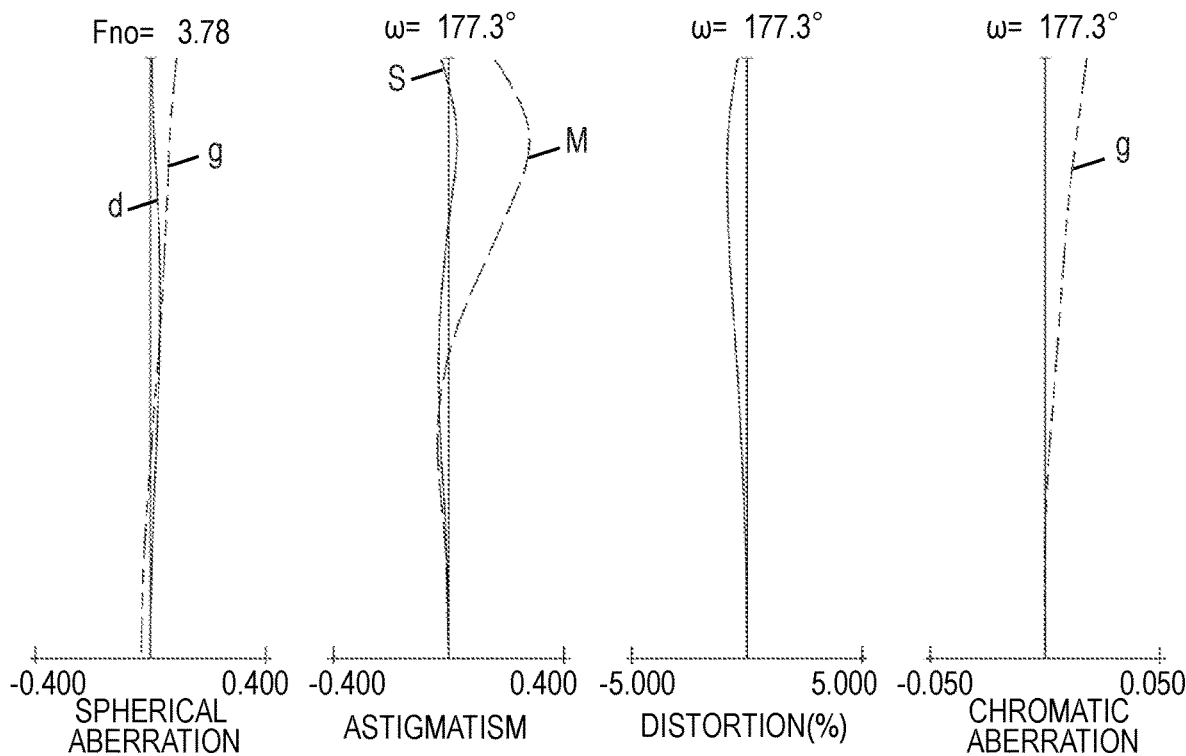
FIG. 6A is a set of aberration diagrams of the zoom lens of Example 3 at the shortest focal length.
Figure 6B:
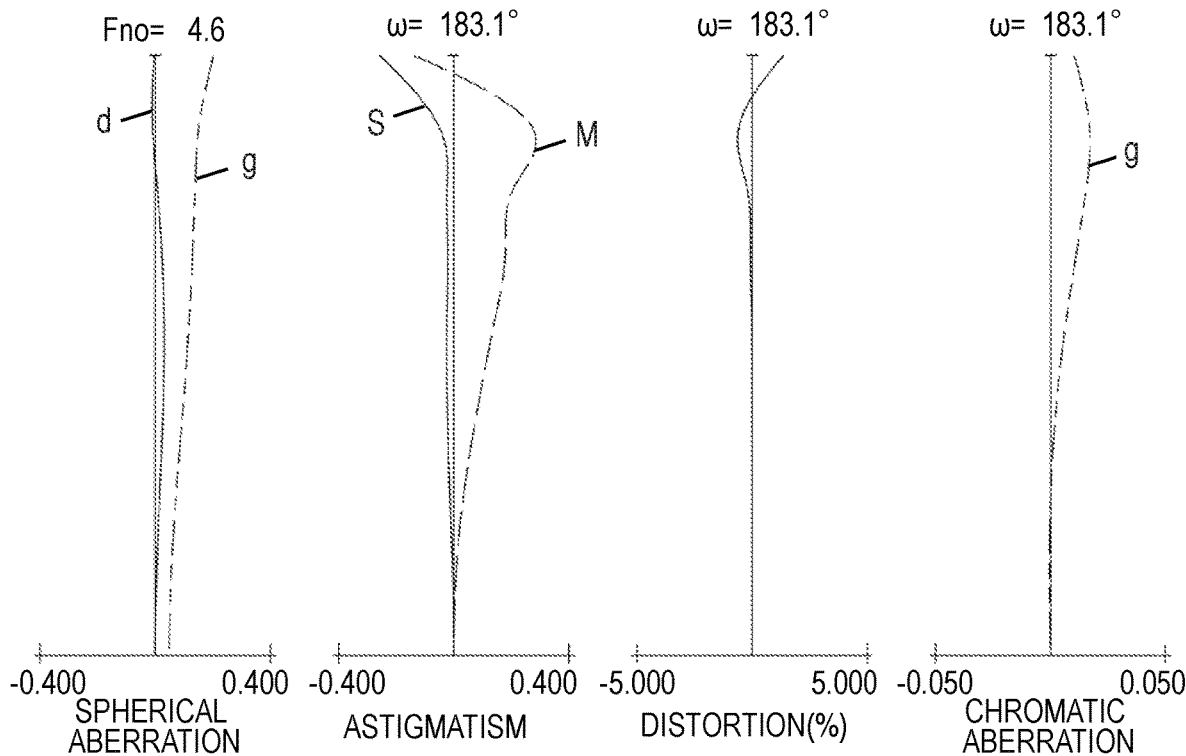
FIG. 6B is a set of aberration diagrams of the zoom lens of Example 3 at the longest focal length.

FIGS. 5A and 5B are lens cross-sectional views of a zoom lens of Example 3 of the present invention at the shortest focal length and the longest focal length, respectively. FIGS. 6A and 6B are sets of aberration diagrams of the zoom lens of Example 3 at the shortest focal length and the longest focal length, respectively. Example 3 represents a zoom lens with a zoom ratio of 1.91 and an F-number of 3.78 to 4.60.

Figure 7:
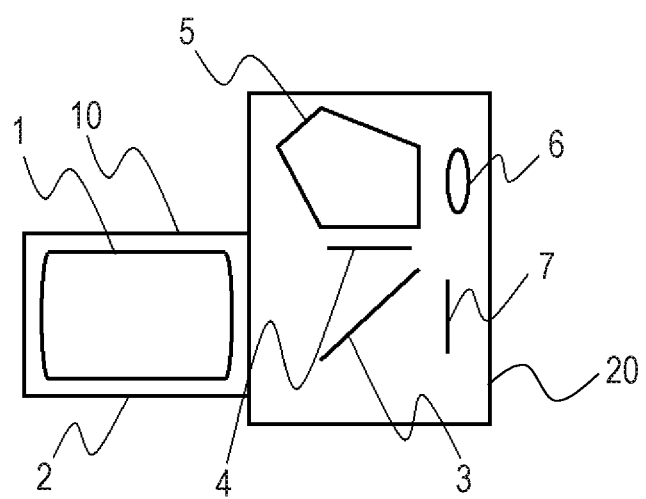
FIG. 7 is a schematic diagram of main parts of an image pickup apparatus according to the present invention.
Figure 8:
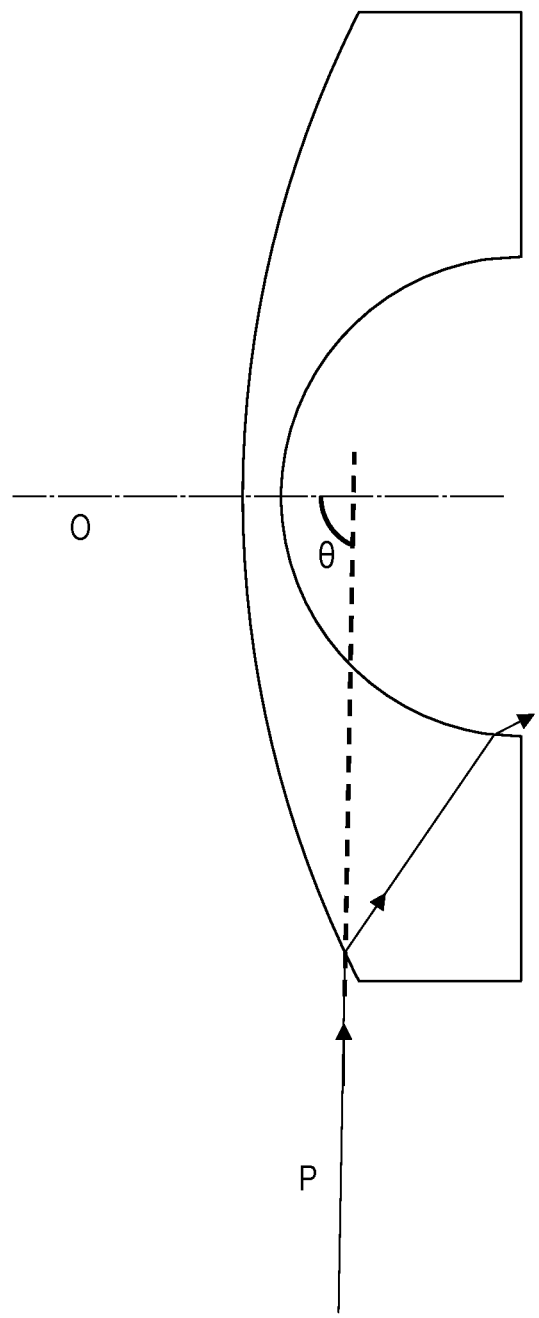
FIG. 8 is an explanatory diagram of an incident angle θ.
Figure 9:
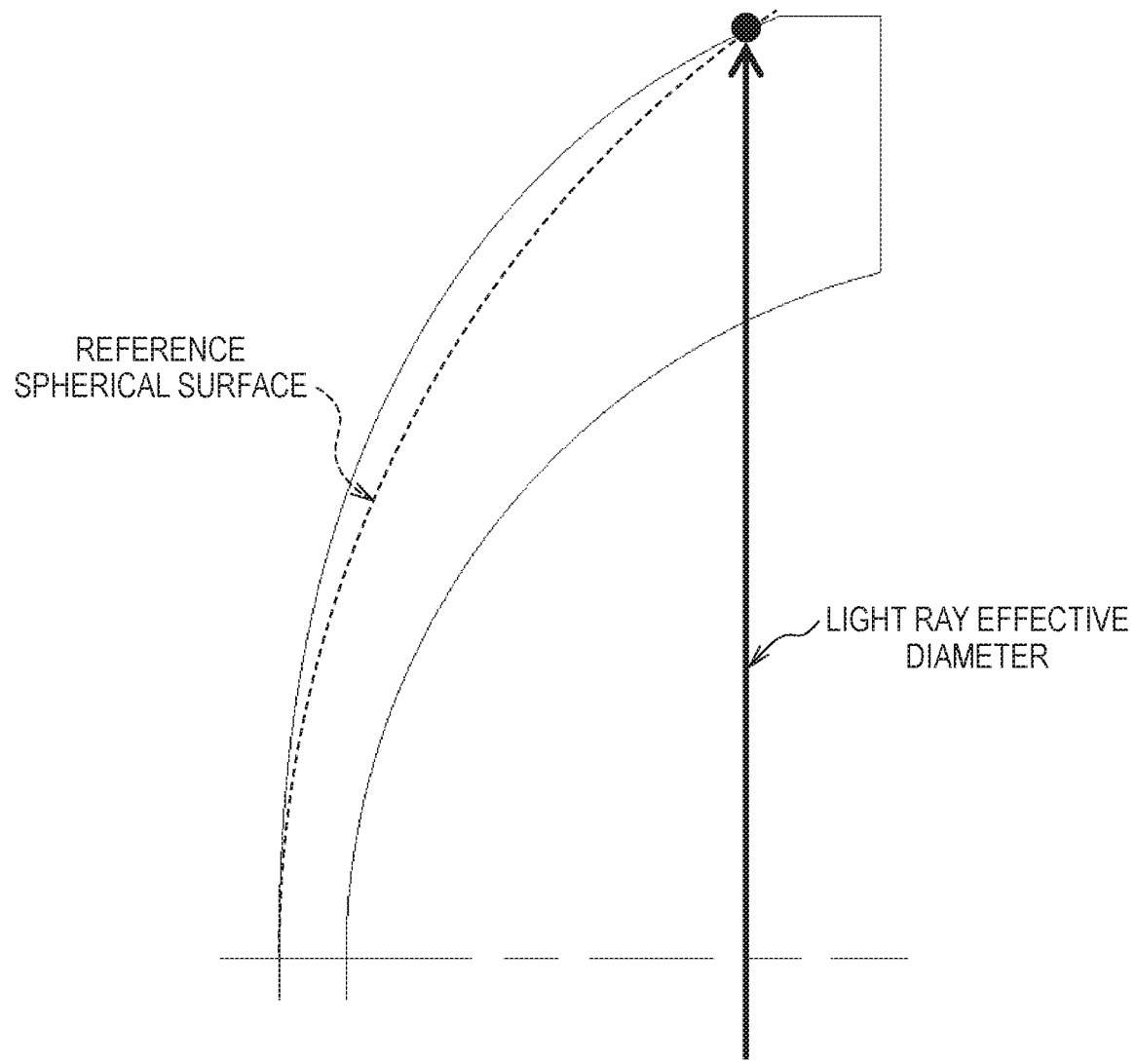
FIG. 9 is an explanatory diagram of the definition of a reference spherical surface for an aspherical surface.
Figure 11:
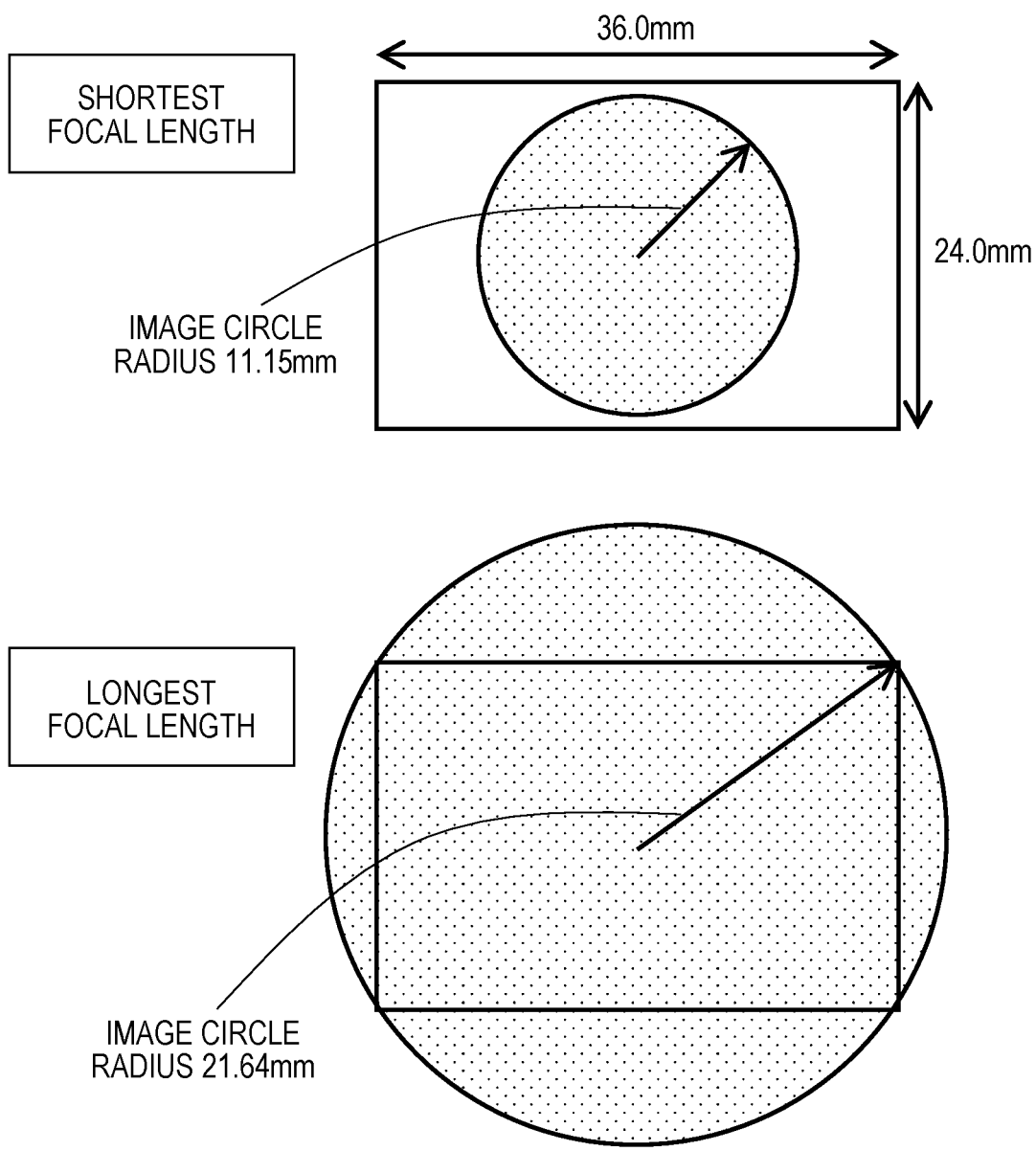
FIG. 11 is an explanatory diagram of the relation in size between an image pickup element and an image circle regarding the zoom lenses of Examples 2 and 3.

FIG. 7 is a schematic diagram of main parts of an image pickup apparatus according to the present invention. FIG. 8 is an explanatory diagram of an incident angle θ of a light ray incident on a zoom lens. FIG. 9 is an explanatory diagram of an aspherical surface shape. FIG. 10 is an explanatory diagram illustrating the relation between an image pickup element and an image circle regarding the zoom lens of Example 1 of the present invention. FIG. 11 is an explanatory diagram illustrating the relation between an image pickup element and an image circle regarding the zoom lenses of Examples 2 and 3 of the present invention.

The zoom lens of each Example is an image pickup optical system for use in an image pickup apparatus such as a video camera, a digital camera, a surveillance camera, a vehicle-mounted camera, or a television camera.

In each lens cross-sectional view, the left-hand side is the object side (front side) while the right-hand side is the image side (rear side). Also, in each lens cross-sectional view, reference sign L0 denotes the zoom lens. Reference sign LR denotes the rear lens group, which has one or more lens units. Reference sign Bi denotes the i-th lens unit, where i represents the order of the lens unit from the object side. Reference sign SP denotes an aperture stop. Reference sign S denotes a flare cut stop. Reference sign IP denotes an image plane. The image plane IP corresponds to the image pickup surface of a solid-state image pickup element (photoelectric conversion element), such as a CCD sensor or a CMOS sensor, in a case where the zoom lens is used as an image pickup optical system for a digital camera, a video camera, or a surveillance camera.

The zoom lens of each Example changes the interval between adjacent lens units during zooming and focusing. The arrows indicate the loci of movement of the lens units during zooming from the shortest focal length to the longest focal length.

In each spherical aberration diagram, a solid line d represents the d-line (wavelength: 587.6 nm) and a two-dot chain line g represents the g-line (wavelength: 435.8 nm). In each astigmatism diagram, a dotted line M represents a meridional image plane of the d-line and a solid line S represents a sagittal image plane of the d-line. The distortion represents indicates values with the d-line based on an equisolid angle projection method. The lateral chromatic aberration is illustrated with the g-line. Reference sign ω denotes the imaging half angle of view (degree), and reference sign Fno denotes the F-number. Note that in each Example, the shortest focal length and the longest focal length refer to such zoom positions that lens units for magnification varying are positioned at the opposite ends of the range on the optical axis within which the lens units are mechanically movable.

In each Example, the plurality of lens units constituting the rear lens group LR include, in order from the object side to the image side, a second lens unit B2 with a positive refractive power, a third lens unit B3 with a negative refractive power, and a fourth lens unit B4 with a positive refractive power. The third lens unit B3 is a focus lens unit that moves during focusing.

The zoom lens of each Example is suitable as a fisheye zoom lens having an imaging half angle of view of 85 degrees or more (i.e. an imaging angle of view of 170 degrees or more). Also, the zoom lens in each Example is suitable as a fisheye zoom lens that can cover circular fisheye to full-frame fisheye.

Meanwhile, in conventional zoom lenses, terms such as "wide angle end" and "telephoto end" are often used to indicate focal length positions. However, in a fisheye zoom lens with its imaging angle of view reaching approximately 180 degrees, the terms "wide angle" and "telephoto" are not always appropriate. Thus, in this description, the focal length positions will be referred to as "shortest focal length" and "longest focal length".

The zoom lens (fisheye zoom lens) of each Example employs an equisolid angle projection method (Y=2×f×sin (θ/2)) as its projection method.

Note that f is any focal length of the zoom lens satisfying shortest focal length fW≤f≤longest focal length fT, θ is the angle at which a principal ray of an off-axis light flux incident on the closest lens surface of the zoom lens to the object side and the optical axis intersect with each other, and Y is the formed image height when the focal length f is given. Here, as illustrated in FIG. 8, the angle θ is the angle at which an optical axis O and an extension line intersect with each other, the extension line being a line along which a principal ray P of an off-axis light flux incident on the closest lens surface to the object side will extend if traveling straight through the lens. Note that the projection method of the zoom lens according to the present invention is not limited to an equisolid angle projection method but may be any projection method.

In the zoom lens according to the present invention, a first lens unit B1, which is the closest lens unit to the object side, has a negative refractive power. The zoom lens has the rear lens group LR, which has one or more lens units and has a positive refractive power as a whole, on the image side relative to the first lens unit B1.

With the first lens unit B1 with a negative refractive power disposed closest to the object side, incoming light rays from imaging half angles of view of 85 degrees and more can be taken in easily. Also, since the zoom lens needs to have a positive refractive power as a whole, the rear lens group LR, which has a positive refractive power as a whole, is disposed on the image side of the first lens unit B1. Also, the magnification is varied from the shortest focal length to the longest focal length by changing the interval between the first lens unit B1 and lens units adjacent to the first lens unit B1 in the optical axis direction.

In the zoom lens according to the present invention, a focus lens unit FL with a negative refractive power is provided as a part of the rear lens group LR, and focusing is performed by moving the focus lens unit FL in the optical axis direction. The lens units in the rear lens group LR are compact. Thus, easy quick focusing is possible by using the third lens unit B3, which is a part of this rear lens group LR, as the focus lens unit FL and performing focusing with the third lens unit B3. Also, in particular, using the third lens unit B3 with a negative refractive power as the focus lens unit FL can further reduce the lens diameter. This also allows easy quick focusing.

Assume that the focal length of the first lens unit B1 is represented by f1, the shortest focal length of the zoom lens is represented by fW, and the curvature radii of the object-side and image-side lens surfaces of a lens G1 in the first lens unit disposed closest to the object side are represented by R1 and R2, respectively. Then, the following conditional expressions are satisfied.

$$0.85 < |f1|/fW < 7.0 \quad (1)$$

$$0.40 < (R1 - R2)/(R1 + R2) < 0.80 \quad (2)$$

Next, the technical meanings of the above conditional expressions will be described. Conditional expression (1) defines the negative refractive power of the first lens unit B1. If the ratio falls below the lower limit value in conditional expression (1), the negative refractive power of the first lens unit B1 is strong (the absolute value of the negative refractive power is large) and the power arrangement (refractive power arrangement) of retrofocus is strong.

This makes it difficult to make the lens total length short. If the ratio exceeds the upper limit value in conditional expression (1), it will be inevitable to vary the magnification within the rear lens group LR and thus necessary to increase the number of lens units and the number of lenses in the rear lens group LR. The consequence will be an increase in size of the whole system. Thus, by satisfying conditional expression (1), it will be easy to obtain a zoom lens with a wide angle of view which is compact as a whole.

Conditional expression (2) relates to the lens shapes (shape factors) of the lens G1, which is closest to the object side in the first lens unit B1. Here, when the object-side lens surface of the lens G1 is a spherical surface, the parameter R1 corresponds to its curvature radius. When the lens surface is an aspherical surface, the parameter R1 corresponds to the curvature radius of its reference spherical surface. When the image-side lens surface of the lens G1 is a spherical surface, the parameter R2 corresponds to its curvature radius. When the lens surface is an aspherical surface, the parameter R2 corresponds to the curvature radius of its reference spherical surface. Note that as illustrated in FIG. 9, a reference spherical surface for an aspherical surface is defined as a spherical surface determined by the surface vertex and the light ray effective diameter of the surface.

A method of determining whether an aspherical surface amount is a positive value or a negative value from lens data in a publicly known document or the actual lens will be presented. A method of specifically calculating the aspherical surface amount will be presented as well. To determine whether an aspherical surface amount is a positive value or a negative value, and to calculate the aspherical surface amount, it is firstly necessary to obtain the radius (curvature radius) of its reference spherical surface. To obtain the radius of this reference spherical surface, it is necessary to obtain the light ray effective diameter.

The effective diameter is not always described in lens data in a document. In that case, the easiest way to obtain the light ray effective diameter is to obtain the actual total lens length in an illustration in a lens cross-sectional view, calculate the scale of the illustration from a known total lens length indicated by numerical data, and multiply the actual dimension of the diameter of the curved surface portion in the illustration by the scale of the illustration. In an illustration of a lens, the diameter of its curved surface portion may be set somewhat larger than the actual light ray effective diameter depending on the optical tool. Nonetheless, this method should suffice to determine whether the aspherical surface amount is a positive value or a negative value and to roughly know the aspherical surface amount.

Conditional expression (2) defines the lens shapes of the lens G1. If the ratio exceeds the upper limit value in conditional expression (2), the curvature radius of the object-side lens surface of the lens G1 is large, thereby making it difficult to take in light rays at an angle of view of approximately 180 degrees. If the ratio falls below the lower limit value in conditional expression (2), the negative refractive power of the lens G1 is weak and the amount of (negative) distortion generated is small, thereby making it difficult for the fisheye zoom lens to obtain an angle of view of approximately 180 degrees.

Otherwise, it will be inevitable to increase the negative refractive power of the lens (G2) adjacent to the image side of the lens G1 in order to compensate the weak negative refractive power of the lens G1. The consequent will be an increase in size of the whole system. Thus, by satisfying conditional expression (2), it will be easy to obtain a fisheye zoom lens which is compact as a whole.

By satisfying conditional expressions (1) and (2), it will be easy to obtain a zoom lens which is compact as a whole and allows easy quick focusing.

Note that in this description, the lens units are defined based on the loci of their movement during focusing and zooming. Specifically, lenses that move along different loci during focusing or zooming are defined as belonging to different lens units. Also, any lens that has substantially no refractive power and disposed further on the object side or the image side of the zoom lens in this description is not included in the zoom lens. Examples of this include a domed cover lens disposed on the object side of the zoom lens to protect the front lens (the closest lens to the object side in the zoom lens), a low-pass filter, a prism, and a cover glass disposed on the image side of the zoom lens, and so on.

More preferably, in each Example, it is desirable to satisfy one or more of the following conditional expressions. Assume that the distance from the closest lens surface of the lens G1 to the object side to the image plane at the shortest focal length (total lens length) is represented by LD, and the distance from the focus lens unit FL to the image plane at the shortest focal length is represented by FD. The zoom lens in each Example has a lens unit A with a positive refractive power within the rear lens group LR on the object side of the focus lens unit FL.

In each Example, the lens unit A corresponds to the second lens unit B2. Also, the zoom lens in each Example has a lens unit B with a positive refractive power within the rear lens group LR on the image side of the focus lens unit FL. In each Example, the lens unit B corresponds to the fourth lens unit B4. Assume that the focal length of the lens unit A is represented by fA, and the focal length of the lens unit B is represented by fB. Assume that the distance from the position of the exit pupil to the image plane at the shortest focal length is represented by TKW. Here, the distance TKW has the plus sign when measured toward the image side and has the minus sign when measured toward the object side. Assume that the back focus at the shortest focal length is represented by BFW, and the focal length of the focus lens unit FL is represented by fF. Then, it is preferable to satisfy one or more of the following conditional expressions.

$$FD/LD<0.55 \quad (3)$$

$$fA/fB>0.19 \quad (4)$$

$$TKW/fW>4.0 \quad (5)$$

$$BFW/fW<3.5 \quad (6)$$

$$2.0<|fF|/fW<8.0 \quad (7)$$

In an image pickup apparatus including the zoom lens according to any one of the Examples and an image pickup element that receives light of an image formed by the zoom lens, it is preferable to satisfy one or more of the following conditional expressions. Assume that the largest image height at the shortest focal length is represented by YW while the largest image height at the longest focal length is represented by YT, and the imaging angle of view at the shortest focal length is represented by ωW (degree) while the imaging angle of view at the longest focal length is represented by ωT (degree). Then, it is preferable to satisfy one or more of the following conditional expressions.

$$1.7<YT/YW<2.5 \quad (8)$$

$$\omega W>170.0 \quad (9)$$

$$\omega T>170.0 \quad (10)$$

Next, the technical meanings of the above conditional expressions will be described. Conditional expression (3) defines the position of the focus lens unit FL on the optical axis. If the ratio exceeds the upper limit value in conditional expression (3), it will be difficult to make the focus lens unit FL compact and thus make quick focusing difficult. By satisfying conditional expression (3), it will be easy to make the focus lens unit FL compact and quick focusing.

Also, it is preferable to provide the lens unit A with a positive refractive power within the rear lens group LR on the object side relative to the focus lens unit FL. By disposing the lens unit A between the first lens unit B1 and the focus lens unit FL, a fisheye zoom lens can easily achieve remarkable optical performance also during zooming. Also, by disposing the lens unit A, light rays incident on the focus lens unit FL can be converged. This makes it easy to make the effective diameter of the focus lens unit FL small.

In this way, it is easy to make the focus lens unit FL compact as well. Consequently, it is easy to achieve quick focusing while making the entire zoom lens compact.

Further, it is preferable to provide the lens unit B with a positive refractive power within the rear lens group LR on the image side relative to the focus lens unit FL. By disposing the lens unit B on the image side of the focus lens unit FL, the position of the exit pupil can be far from the image plane. Generally, an image pickup apparatus using an image pickup element suffers from vignetting of light rays incident on the image pickup element inside the image pickup element if the distance from the exit pupil to the image plane is short (i.e. the angle of light rays incident on the image pickup element is large). For this reason, the position of the exit pupil is preferably far from the image plane.

Conditional expression (4) defines the power arrangement of the lens units A and B with positive refractive powers at the object and image sides of the focus lens unit FL. If the ratio falls below the lower limit value in conditional expression (4), the positive refractive power of the lens unit B is weak and the position of the exit pupil is too close to the image plane. Accordingly, vignetting of light rays incident on the image pickup element may possibly occur inside the image pickup element. To compensate for this, the outer diameter of each lens (polished surface diameter) needs to be made large to take in a larger amount of light from the off-axis light flux. Consequently, the size of the entire system will be large. Thus, by satisfying conditional expression (4), it will be easy to make the entire system compact.

Conditional expression (5) defines the position of the exit pupil of the zoom lens. If the ratio falls below the lower limit value in conditional expression (5), the position of the exit pupil is too close to the image plane. Accordingly, vignetting of light rays incident on the image pickup element may possibly occur inside the image pickup element. To compensate for this, the entire zoom lens needs to be made large to take in a larger amount of light from the off-axis light flux. Consequently, the size of the entire system will be large. Thus, by satisfying conditional expression (5), it will be easy to make the entire system compact.

Conditional expression (6) defines the relation between the focal length of the entire system and the back focus at the shortest focal length. If the ratio exceeds the upper limit value in conditional expression (6), the back focus is too long, thereby making it difficult to make the entire system compact. By satisfying conditional expression (6), it will be easy to obtain a zoom lens which is compact as a whole.

Conditional expression (7) defines the relation between the focal length of the entire system and the focal length of the focus lens unit FL at the shortest focal length. If the ratio exceeds the upper limit value in conditional expression (7), the negative refractive power of the focus lens unit FL is too weak (the absolute value of the negative refractive power is too small) and the distance of movement during focusing is long, thereby making quick focusing difficult. On the other hand, if the ratio falls below the lower limit value in conditional expression (7), the negative refractive power of the focus lens unit FL is too strong (the absolute value of the negative refractive power is too large), thereby making it difficult to maintain good optical performance during focusing.

Thus, by satisfying conditional expression (7), it will be easy to obtain a fisheye zoom lens that allows easy quick focusing and also has remarkable image quality.

Conditional expression (8) defines the relation between the largest image height YW at the shortest focal length and the largest image height YT at the longest focal length. If the ratio exceeds the upper limit value in conditional expression (8), the zoom ratio is large, and the movement amount of each lens unit during zooming is large or the refractive power of each lens unit is large. If the movement amount of each lens unit is large, the size of the entire system will be large. If the refractive power of each lens unit is large, it will be necessary to increase the number of lenses in each lens unit to suppress aberration variation, which will make the size of the entire system large. If the ratio falls below the lower limit value in conditional expression (8), it will be difficult to form a zoom lens that can cover circular fisheye to full-frame fisheye.

Thus, by satisfying conditional expression (8), it will be easy to obtain a fisheye zoom lens which is compact as a whole and can cover circular fisheye to full-frame fisheye.

Conditional expression (9) defines the imaging angle of view ωW (degree) at the shortest focal length, and conditional expression (10) defines the imaging angle of view ωT (degree) at the longest focal length. Conditional expression (9) and conditional expression (10) are conditions that the fisheye zoom lens should satisfy. If the value falls below the lower limit value in conditional expression (9) or (10), the imaging angle of view is too small, thereby making it difficult to form a fisheye zoom lens. It is more preferable to satisfy the following expressions (1a) to (8a).

$$0.90<|f1|/fW<5.0 \qquad (1a)$$

$$0.45<(R1-R2)/(R1+R2)<0.75 \qquad (2a)$$

$$FD/LD<0.50 \qquad (3a)$$

$$fA/fB>0.20 \qquad (4a)$$

$$TKW/fW>4.3 \qquad (5a)$$

$$BFW/fW<3.0 \qquad (6a)$$

$$2.8<|fF|/fW<7.5 \qquad (7a)$$

$$1.73<YT/YW<2.20 \qquad (8a)$$

It is still more preferable to satisfy the following expressions (1b) to (8b).

$$1.00<|f1|/fW<3.0 \qquad (1b)$$

$$0.50<(R1-R2)/(R1+R2)<0.70 \qquad (2b)$$

$$FD/LD<0.45 \qquad (3b)$$

$$fA/fB>0.205 \qquad (4b)$$

$$TKW/fW>4.5 \qquad (5b)$$

$$BFW/fW<2.8 \qquad (6b)$$

$$3.3<|fF|/fW<7.0 \qquad (7b)$$

$$1.77<YT/YW<2.10 \qquad (8b)$$

In each Example, it is preferable for the first lens unit B1 with a negative refractive power to have two or more negative lenses and one or more positive lenses.

A fisheye zoom lens receives light rays from an extremely wide imaging angle of view. Thus, if the first lens unit B1 consists of only one negative lens, it will be preferable to correct the field curvature. For this reason, it is preferable for the first lens unit B1 to have two or more negative lenses. Also, without any positive lens, it will be difficult to correct the chromatic aberration. Thus, by having two or more negative lenses and one or more positive lenses, it will be easy to correct the chromatic aberration and the field curvature.

Further, it is preferable for the lens unit A with a positive refractive power to have one or more negative lenses and one or more positive lenses. If the lens unit A consists of only one positive lens, it will be difficult to correct the chromatic aberration. For this reason, it is preferable for the lens unit A to have not only one or more positive lenses but also one or more negative lenses.

Note that while focusing is preferably performed with the lens unit with a negative refractive power in the rear lens group LR, focusing may be performed with the first lens unit B1 or a lens subunit being a part of the first lens unit B1. Alternatively, focusing may be performed by shifting all lens units. Still alternatively, focusing may be performed with any lens unit(s).

Next, the lens configuration in each Example will be described.

Example 1

The plurality of lens units constituting the zoom lens in Example 1 consists of, in order from the object side to the image side, a first lens unit B1 with a negative refractive power, a second lens unit B2 with a positive refractive power, a third lens unit B3 with a negative refractive power, and a fourth lens unit B4 with a positive refractive power. In Example 1, the third lens unit B3 corresponds to the focus lens unit FL. In Example 1, the rear lens group LR consists of the second lens unit B2 to the fourth lens unit B4.

During zooming from the shortest focal length to the longest focal length, the following occurs. The first lens unit B1 to the fourth lens unit B4 move so as to narrow the air interval between the first lens unit B1 and the second lens unit B2, widen the air interval between the second lens unit B2 and the third lens unit B3, and narrow the air interval between the third lens unit B3 and the fourth lens unit B4. During the zooming, the second lens unit B2 and the fourth lens unit B4 move along the same locus. The position of the exit pupil described in numerical data 1 to be mentioned later indicates the distance from the final lens surface to the exit pupil (the distance toward the object side is a negative value whereas the distance toward the image side is a positive value).

The zoom lens in this Example is suitable for an image pickup element of the so-called APS-C size (screen size: 22.5 mm×15.0 mm). As illustrated in FIG. 10, the zoom lens achieves circular fisheye at the shortest focal length and full-frame fisheye at the longest focal length. As described above, the zoom lens in this Example is suitable as a fisheye zoom lens which is compact as a whole and allows easy quick focusing.

Example 2

The plurality of lens units constituting the zoom lens in Example 2 consists of, in order from the object side to the image side, a first lens unit B1 with a negative refractive power, a second lens unit B2 with a positive refractive power, a third lens unit B3 with a negative refractive power, and a fourth lens unit B4 with a positive refractive power. The third lens unit B3 corresponds to the focus lens unit FL. In Example 2, the rear lens group LR consists of the second lens unit B2 to the fourth lens unit B4.

During zooming from the shortest focal length to the longest focal length, the air interval between the first lens unit B1 and the second lens unit B2 is narrowed. The air interval between the second lens unit B2 and the third lens unit B3 and the air interval between the third lens unit B3 and the fourth lens unit B4 remain constant.

The zoom lens in this Example is suitable for an image pickup element of the so-called full-frame size (screen size: 36.0 mm×24.0 mm). As illustrated in FIG. 11, the zoom lens achieves circular fisheye at the shortest focal length and full-frame fisheye at the longest focal length. The first lens unit B1 moves toward the image side whereas the second lens unit B2, the third lens unit B3, and the fourth lens unit B4 move together (along the same locus) toward the object side. As described above, the zoom lens in this Example is suitable as a zoom lens which is compact as a whole and allows easy quick focusing.

Example 3

The plurality of lens units constituting the zoom lens in Example 3 consists of, in order from the object side to the image side, a first lens unit B1 with a negative refractive power, a second lens unit B2 with a positive refractive power, a third lens unit B3 with a negative refractive power, and a fourth lens unit B4 with a positive refractive power. The third lens unit B3 corresponds to the focus lens unit FL. In Example 3, the rear lens group LR consists of the second lens unit B2 to the fourth lens unit B4.

During zooming from the shortest focal length to the longest focal length, the first lens unit B1 moves toward the image side, the second lens unit B2 moves toward the object side, and the third lens unit B3 and the fourth lens unit B4 move together toward the object side. During this movement, the air interval between the first lens unit B1 and the second lens unit B2 is narrowed, and the air interval between the second lens unit B2 and the third lens unit B3 is also narrowed. The air interval between the third lens unit B3 and the fourth lens unit B4 remains constant.

As in Example 2, the zoom lens in this Example is a zoom lens suitable for an image pickup element of the so-called full-frame size (screen size: 36.0 mm×24.0 mm). As illustrated in FIG. 11, the zoom lens achieves circular fisheye at the shortest focal length and is full-frame fisheye at the longest focal length. As described above, the zoom lens in this Example is suitable as a zoom lens which is compact as a whole and allows easy quick focusing.

FIG. 7 is a schematic diagram of main parts of a single-lens reflex camera (image pickup apparatus) having the zoom lens according to the present invention. In FIG. 7, reference sign 10 denotes an optical system having a zoom lens 1 according to any one of Examples 1 to 3.

The optical system 10 is held by a lens barrel 2 serving as a holding member. Reference sign 20 denotes a camera body. The camera body 20 includes a quick return mirror 3, a focusing plate 4, a penta-roof prism 5, an eyepiece 6, and so on. The quick return mirror 3 reflects a light flux from the optical system 10 in an upward direction. The focusing plate 4 is disposed at the position at which the optical system 10 forms an image. The penta-roof prism 5 transforms an inverted image formed on the focusing plate 4 into an erect image. The observer observes this erect image through the eyepiece 6.

Reference numeral 7 denotes a light receiving plane, at which an image pickup element (photoelectric conversion element), such as a CCD sensor or a CMOS sensor, that receives light of an image is disposed. During imaging, the quick return mirror 3 is retreated from the optical path, so that an image is formed on the light receiving plane 7 by the optical system 10.

By applying the zoom lens according to the present invention to an image pickup apparatus such as a single-lens reflex camera as above, high optical performance is achieved. Note that besides digital cameras, video cameras, and the like, the zoom lens according to the present invention is also applicable to other optical apparatuses such as telescopes, binoculars, photocopiers, and projectors. The zoom lens according to the present invention is also applicable to mirrorless single-lens reflex cameras without a quick return mirror (mirrorless cameras).

Preferred embodiments of the present invention have been described above. However, the present invention is not limited to these embodiments. Various modifications and changes are possible within the range of the gist of the present invention.

Numerical data 1 to numerical data 3 corresponding respectively to Example 1 to Example 3 are presented below. In each of numerical data 1 to numerical data 3, reference sign i denotes the order of a surface from the object side, reference sign ri denotes the i-th (i-th surface's) curvature radius, reference sign di denotes the interval between the i-th surface and the i+1-th surface, and reference signs ndi and vdi respectively denote the refractive index and Abbe number of the material between the i-th surface and the i+1-th surface based on the d-line. ri and di are both in units of millimeters. Reference sign BF denotes the back focus.

Also, each aspherical surface is indicated by attaching an asterisk after its surface number. An aspherical surface shape is expressed as below, where X is the amount of displacement from the surface vertex in the optical axis direction, h is the height from an optical axis in a direction perpendicular to the optical axis, r is the paraxial curvature radius, K is the conic constant, and A4, A6, A8, and A10 are the aspherical coefficients of the respective orders.

$$X(h) = \frac{(1/r)h^2}{1 + \sqrt{\{1 - (1+K)(h/r)^2\}}} + A4 \cdot h^4 + A6 \cdot h^6 + A8 \cdot h^8 + A10 \cdot h^{10}$$

Note that "E±XX" in each aspherical coefficient means "×10$^{\pm XX}$". Also, numerical values corresponding to the above-mentioned conditional expressions in numerical data 1 to numerical data 3 are presented in table 1.

[Numerical Data 1]

[Unit mm]

Surface data

| Surface number | r | d | nd | vd | Effective diameter |
|---|---|---|---|---|---|
| 1 | 42.058 | 1.70 | 1.76385 | 48.5 | 38.33 |
| 2 | 9.802 | 11.16 | | | 19.52 |
| 3 | −181.057 | 0.90 | 1.77250 | 49.6 | 17.03 |
| 4 | 18.735 | 1.93 | | | 15.48 |
| 5 | 43.989 | 0.70 | 1.59270 | 35.3 | 15.21 |
| 6 | 9.278 | 4.13 | 1.78760 | 23.4 | 14.14 |
| 7 | 39.195 | (variable) | | | 13.41 |
| 8 | ∞ | 0.50 | | | 9.58 |
| 9 | 20.023 | 0.50 | 1.90366 | 31.3 | 8.74 |
| 10 | 6.478 | 3.44 | 1.66680 | 33.0 | 7.85 |
| 11 | −45.131 | 1.81 | | | 6.76 |
| 12 (stop) | ∞ | 4.07 | | | 7.10 |

-continued

[Unit mm]

| | | | | | |
|---|---|---|---|---|---|
| 13 | 23.643 | 0.50 | 1.90315 | 29.8 | 7.88 |
| 14 | 7.074 | 4.61 | 1.77250 | 49.6 | 7.79 |
| 15* | −14.898 | (variable) | | | 7.86 |
| 16 | −313.488 | 0.40 | 1.77250 | 49.6 | 9.52 |
| 17 | 17.486 | (variable) | | | 9.92 |
| 18 | −118.257 | 1.80 | 1.59270 | 35.3 | 13.91 |
| 19 | −53.165 | 0.20 | | | 15.12 |
| 20 | 24.339 | 6.62 | 1.72342 | 38.0 | 18.19 |
| 21 | −15.487 | 0.70 | 1.78760 | 23.4 | 18.55 |
| 22* | 1042.853 | (variable) | | | 19.50 |
| Image plane | ∞ | | | | |

Aspheric surface data

15th surface

K = 0.00000e+000
A4 = 8.52216e−006
A6 = −1.06178e−006
A8 = 1.05133e−009
A10 = −1.85188e−010

22th surface

K = 0.00000e+000
A4 = 2.46601e−006
A6 = −3.76847e−008
A8 = 1.71654e−011
A10 = 1.36759e−012

Various data
Zoom ratio 1.79

| Focal length | 5.30 | 9.51 |
|---|---|---|
| F-number | 3.50 | 3.50 |
| Angle of view (degree) | 181.0 | 182.0 |
| Image height | 7.50 | 13.50 |
| Total lens length | 77.28 | 69.52 |
| BF | 11.09 | 16.77 |
| d7 | 14.45 | 1.00 |
| d15 | 0.90 | 2.30 |
| d17 | 5.18 | 3.78 |
| d22 | 11.09 | 16.77 |
| Entrance pupil position | 11.53 | 10.39 |
| Exit pupil position | −29.96 | −27.27 |
| Front principal point position | 16.14 | 17.84 |
| Rear principal point position | 5.79 | 7.27 |

Lens unit data

| Unit | Start surface | Focal length | Lens structure length | Front principal point position | Rear principal point position |
|---|---|---|---|---|---|
| 1 | 1 | −9.13 | 20.52 | 4.54 | −10.30 |
| 2 | 8 | 12.98 | 15.42 | 9.84 | −3.71 |
| 3 | 16 | −21.43 | 0.40 | 0.21 | −0.01 |
| 4 | 18 | 31.43 | 9.32 | 0.86 | −4.61 |

Single lens data

| Lens | Start surface | Focal length |
|---|---|---|
| 1 | 1 | −17.12 |
| 2 | 3 | −21.94 |
| 3 | 5 | −19.99 |
| 4 | 6 | 14.55 |
| 5 | 9 | −10.79 |
| 6 | 10 | 8.73 |
| 7 | 13 | −11.34 |
| 8 | 14 | 6.83 |
| 9 | 16 | −21.43 |
| 10 | 18 | 161.30 |
| 11 | 20 | 14.06 |
| 12 | 21 | −19.37 |

[Numerical Data 2]

[Unit mm]

Surface data

| Surface number | r | d | nd | vd | Effective diameter |
|---|---|---|---|---|---|
| 1 | 55.936 | 2.00 | 1.77250 | 49.6 | 49.36 |
| 2 | 12.536 | 11.83 | | | 25.00 |
| 3 | 162.258 | 1.20 | 1.76385 | 48.5 | 24.25 |
| 4 | 30.248 | 5.02 | | | 22.42 |
| 5 | −46.631 | 1.00 | 1.76385 | 48.5 | 21.61 |
| 6 | 42.873 | 0.15 | | | 21.37 |
| 7 | 30.728 | 4.96 | 1.78760 | 23.4 | 21.59 |
| 8 | −37.223 | 2.13 | | | 21.34 |
| 9* | −32.812 | 1.00 | 1.68893 | 31.1 | 19.25 |
| 10 | −157.802 | (variable) | | | 18.75 |
| 11 | ∞ | 1.58 | | | 10.04 |
| 12 | 24.858 | 3.81 | 1.60342 | 38.0 | 10.69 |
| 13 | −9.286 | 0.60 | 1.90315 | 29.8 | 10.72 |
| 14 | −78.312 | 0.50 | | | 11.20 |
| 15* | 34.215 | 2.97 | 1.58313 | 59.4 | 11.54 |
| 16 | −14.358 | 1.97 | | | 11.67 |
| 17 (stop) | ∞ | (variable) | | | 10.44 |
| 18 | 32.205 | 1.61 | 1.80809 | 22.8 | 9.22 |
| 19 | −61.211 | 0.50 | 1.80440 | 39.6 | 8.84 |
| 20 | 15.056 | (variable) | | | 8.41 |
| 21 | −29.004 | 0.60 | 1.85478 | 24.8 | 8.26 |
| 22 | 20.886 | 4.06 | 1.59270 | 35.3 | 8.87 |
| 23 | −28.837 | 0.15 | | | 11.80 |
| 24 | 283.566 | 1.89 | 1.59270 | 35.3 | 12.98 |
| 25 | −125.496 | 0.15 | | | 14.20 |
| 26 | 23.175 | 0.90 | 1.83481 | 42.7 | 16.51 |
| 27 | 14.669 | 5.10 | 1.59522 | 67.7 | 16.85 |
| 28 | −709.918 | (variable) | | | 17.90 |
| Image plane | ∞ | | | | |

Aspheric surface data

9th surface

K = 0.00000e+000
A4 = 4.73829e−007
A6 = 5.15267e−008
A8 = −4.34380e−010
A10 = 3.47894e−012

15th surface

K = 0.00000e+000
A4 = −6.78871e−005
A6 = 1.91141e−007
A8 = −4.72531e−009
A10 = 6.39557e−011

Various data
Zoom ratio 1.89

| Focal length | 8.05 | 15.21 |
|---|---|---|
| F-number | 3.79 | 4.59 |
| Angle of view (degree) | 177.3 | 180.5 |
| Image height | 11.15 | 21.64 |
| Total lens length | 103.35 | 101.76 |
| BF | 21.01 | 35.69 |
| d10 | 21.89 | 5.61 |
| d17 | 2.23 | 2.23 |
| d20 | 2.54 | 2.54 |
| d28 | 21.01 | 35.69 |
| Entrance pupil position | 14.60 | 13.78 |
| Exit pupil position | −17.40 | −17.40 |
| Front principal point position | 20.97 | 24.63 |
| Rear principal point position | 12.96 | 20.48 |

Lens unit data

[Unit mm]

| Unit | Start surface | Focal length | Lens structure length | Front principal point position | Rear principal point position |
|---|---|---|---|---|---|
| 1 | 1 | −11.65 | 29.29 | 5.19 | −17.09 |
| 2 | 11 | 17.40 | 11.42 | 5.35 | −3.66 |
| 3 | 18 | −37.43 | 2.11 | 2.33 | 1.10 |
| 4 | 21 | 82.16 | 12.86 | 13.58 | 7.48 |

Single lens data

| Lens | Start surface | Focal length |
|---|---|---|
| 1 | 1 | −21.34 |
| 2 | 3 | −48.87 |
| 3 | 5 | −29.10 |
| 4 | 7 | 22.08 |
| 5 | 9 | −60.33 |
| 6 | 12 | 11.69 |
| 7 | 13 | −11.71 |
| 8 | 15 | 17.74 |
| 9 | 18 | 26.32 |
| 10 | 19 | −14.98 |
| 11 | 21 | −14.13 |
| 12 | 22 | 21.08 |
| 13 | 24 | 147.03 |
| 14 | 26 | −50.29 |
| 15 | 27 | 24.21 |

[Numerical Data 3]

[Unit mm]

Surface data

| Surface number | r | d | nd | vd | Effective diameter |
|---|---|---|---|---|---|
| 1 | 56.490 | 2.00 | 1.77250 | 49.6 | 50.45 |
| 2 | 13.088 | 13.22 | | | 26.04 |
| 3 | −87.448 | 1.20 | 1.76385 | 48.5 | 25.37 |
| 4 | 56.343 | 3.18 | | | 23.82 |
| 5 | −60.484 | 1.20 | 1.77250 | 49.6 | 23.46 |
| 6 | 29.439 | 0.15 | | | 23.06 |
| 7 | 26.298 | 6.32 | 1.78760 | 23.4 | 23.36 |
| 8 | −33.786 | 4.50 | | | 23.13 |
| 9* | −24.786 | 1.00 | 1.84666 | 23.8 | 18.08 |
| 10 | −50.968 | (variable) | | | 17.90 |
| 11 | ∞ | 1.58 | | | 9.67 |
| 12* | 23.084 | 4.80 | 1.58313 | 59.4 | 10.31 |
| 13 | −11.573 | 0.70 | 1.80100 | 35.0 | 10.38 |
| 14 | −20.802 | 0.15 | | | 10.56 |
| 15 | 83.388 | 1.80 | 1.80440 | 39.6 | 10.40 |
| 16 | −25.168 | 0.70 | 1.90366 | 31.3 | 10.23 |
| 17 | −236.860 | 1.06 | | | 10.09 |
| 18 (stop) | ∞ | (variable) | | | 9.80 |
| 19 | 31.814 | 0.70 | 1.83481 | 42.7 | 8.38 |
| 20 | 17.928 | (variable) | | | 8.15 |
| 21 | −94.148 | 0.70 | 1.90366 | 31.3 | 14.39 |
| 22 | 33.362 | 4.00 | 1.59270 | 35.3 | 15.73 |
| 23 | −53.356 | 0.15 | | | 18.04 |
| 24* | 28.697 | 1.00 | 1.85400 | 40.4 | 23.26 |
| 25 | 18.150 | 6.92 | 1.49700 | 81.5 | 23.67 |
| 26 | −375.979 | 0.15 | | | 25.36 |
| 27 | 34.785 | 4.58 | 1.56732 | 42.8 | 29.48 |
| 28 | 140.000 | (variable) | | | 29.94 |
| Image plane | ∞ | | | | |

Aspheric surface data

9th surface

K = 0.00000e+000
A4 = 4.69356e−006
A6 = −1.22814e−007
A8 = 1.34084e−009
A10 = −5.51465e−012

12th surface

K = 0.00000e+000
A4 = −3.21536e−005
A6 = 2.71720e−007
A8 = −3.24720e−009
A10 = 9.35193e−012

24th surface

K = 0.00000e+000
A4 = −3.17129e−006
A6 = 3.78703e−008
A8 = −1.62056e−010
A10 = 5.04675e−013

Various data
Zoom ratio 1.91

| | | |
|---|---|---|
| Focal length | 8.01 | 15.30 |
| F-number | 3.78 | 4.60 |
| Angle of view (degree) | 177.3 | 183.1 |
| Image height | 11.15 | 21.64 |
| Total lens length | 105.23 | 103.57 |
| BF | 12.00 | 28.46 |
| d10 | 20.47 | 3.08 |
| d18 | 4.80 | 4.07 |
| d20 | 6.19 | 6.19 |
| d28 | 12.00 | 28.46 |
| Entrance pupil position | 15.17 | 14.20 |
| Exit pupil position | −31.50 | −30.15 |
| Front principal point position | 21.70 | 25.51 |
| Rear principal point position | 3.99 | 13.16 |

Lens unit data

| Unit | Start surface | Focal length | Lens structure length | Front principal point position | Rear principal point position |
|---|---|---|---|---|---|
| 1 | 1 | −11.78 | 32.77 | 5.72 | −18.35 |
| 2 | 11 | 19.25 | 10.79 | 3.71 | −4.07 |
| 3 | 19 | −50.36 | 0.70 | 0.89 | 0.50 |
| 4 | 21 | 56.40 | 17.51 | 8.43 | −2.33 |

Single lens data

| Lens | Start surface | Focal length |
|---|---|---|
| 1 | 1 | −22.50 |
| 2 | 3 | −44.70 |
| 3 | 5 | −25.48 |
| 4 | 7 | 19.69 |
| 5 | 9 | −58.00 |
| 6 | 12 | 13.93 |
| 7 | 13 | −33.70 |
| 8 | 15 | 24.21 |
| 9 | 16 | −31.21 |
| 10 | 19 | −50.36 |
| 11 | 21 | −27.19 |
| 12 | 22 | 35.24 |
| 13 | 24 | −60.46 |

-continued

[Unit mm]

| 14 | 25 | 35.04 |
| 15 | 27 | 80.32 |

TABLE 1

| | | Example 1 | Example 2 | Example 3 |
|---|---|---|---|---|
| (1) | \|f1\|/fW | 1.72 | 1.45 | 1.47 |
| (2) | (R1 − R2)/(R1 + R2) | 0.62 | 0.63 | 0.62 |
| (3) | FD/LD | 0.34 | 0.37 | 0.35 |
| (4) | fA/fB | 0.41 | 0.21 | 0.34 |
| (5) | TKW/fW | 7.75 | 4.77 | 5.43 |
| (6) | BFW/fW | 2.09 | 2.61 | 1.50 |
| (7) | \|fF\|/fW | 4.04 | 4.65 | 6.28 |
| (8) | YT/YW | 1.80 | 1.94 | 1.94 |
| (9) | ωW | 181.0 | 177.0 | 177.3 |
| (10) | ωT | 182.0 | 180.5 | 183.1 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-183451, filed Sep. 25, 2017, which is hereby incorporated by reference herein in its entirety.

What is claimed is:

1. A zoom lens comprising, in order from an object side to an image side, a first lens unit with a negative refractive power and a rear lens group including one or more lens units, intervals between adjacent ones of the lens units being changed during zooming and focusing, wherein
the first lens unit comprises three or more negative lenses,
the rear lens group comprises a focus lens unit with a negative refractive power that moves during focusing,
the rear lens group consists of, in order from the object side to the image side, a second lens unit with a positive refractive power, a third lens unit as the focus lens unit with a negative refractive power, and a fourth lens unit with a positive refractive power,
the fourth lens unit moves toward the object side monotonically during zooming from a wide angle end to a telephoto end, and
the following conditional expressions are satisfied:

$0.85 < |f1|/fW < 7.0$, $0.62 \leq (R1−R2)/(R1+R2) < 0.80$, $2.0 < |fF|/fW < 7.0$, and $BFW/fW < 3.0$, where f1 represents a focal length of the first lens unit, fW represents a shortest focal length of the zoom lens, R1 and R2 represent curvature radii of object-side and image-side lens surfaces of a lens G1 in the first lens unit disposed closest to the object side, respectively, fF represents a focal length of the focus lens unit, and BFW represents a back focus at the shortest focal length.

2. The zoom lens according to claim 1, wherein the following conditional expression is satisfied:

$FD/LD < 0.55$, where LD represents a distance from the object-side lens surface of the lens G1 to an image plane at the shortest focal length, and FD represents a distance from a most object side lens surface of the focus lens unit to the image plane at the shortest focal length.

3. The zoom lens according to claim 1, wherein the rear lens group comprises a lens unit A with a positive refractive power disposed on an object side of the focus lens unit.

4. The zoom lens according to claim 1, wherein the rear lens group comprises a lens unit B with a positive refractive power disposed on an image side of the focus lens unit.

5. The zoom lens according to claim 1, wherein
the rear lens group comprises a lens unit A with a positive refractive power disposed on an object side of the focus lens unit and a lens unit B with a positive refractive power disposed on an image side of the focus lens unit, and
the following conditional expression is satisfied:

$fA/fB > 0.19$, where fA represents a focal length of the lens unit A, and fB represents a focal length of the lens unit B.

6. The zoom lens according to claim 1, wherein the following conditional expression is satisfied:

$TKW/fW > 4.0$, where TKW represents a distance from a position of an exit pupil to an image plane at the shortest focal length.

7. The zoom lens according to claim 1, wherein the first lens unit comprises one or more positive lenses.

8. The zoom lens according to claim 1, wherein
the rear lens group comprises a lens unit A with a positive refractive power disposed on an object side of the focus lens unit, and
the lens unit A comprises one or more positive lenses and one or more negative lenses.

9. An image pickup apparatus comprising:
a zoom lens; and
an image pickup element that receives light of an image formed by the zoom lens, wherein
the zoom lens is a zoom lens which comprises, in order from an object side to an image side, a first lens unit with a negative refractive power and a rear lens group including one or more lens units, in which intervals between adjacent ones of the lens units are changed during zooming and focusing, and wherein
the first lens unit comprises three or more negative lenses,
the rear lens group comprises a focus lens unit with a negative refractive power that moves during focusing, and
the following conditional expressions are satisfied:

$0.85 < |f1|/fW < 7.0$, $0.40 < (R1−R2)/(R1+R2) < 0.80$, $2.0 < |fF|/fW < 7.0$, and $1.7 < YT/YW < 2.5$, where f1 represents a focal length of the first lens unit, fW represents a shortest focal length of the zoom lens, R1 and R2 represent curvature radii of object-side and image-side lens surfaces of a lens G1 in the first lens unit disposed closest to the object side, respectively, fF represents a focal length of the focus lens unit, YW represents a largest image height at the shortest focal length, and YT represents a largest image height at a longest focal length.

10. The image pickup apparatus according to claim 9, wherein the following conditional expressions are satisfied:

$$\omega W > 170.0 \text{ (degrees), and}$$

$$\omega T > 170.0 \text{ (degrees)},$$

where $\omega W$ represents an imaging angle of view at the shortest focal length, and $\omega T$ represents an imaging angle of view at a longest focal length.

11. An image pickup apparatus comprising:

a zoom lens; and an image pickup element that receives light of an image formed by the zoom lens, wherein the zoom lens is a zoom lens which comprises, in order from an object side to an image side, a first lens unit with a negative refractive power and a rear lens group including one or more lens units, in which intervals between adjacent ones of the lens units are changed during zooming and focusing, and wherein the first lens unit comprises three or more negative lenses, the rear lens group comprises a focus lens unit with a negative refractive power that moves during focusing, and the following conditional expressions are satisfied:

$$0.85 < |f1|/fW < 7.0,$$

$$0.40 < (R1-R2)/(R1+R2) < 0.80,$$

$$2.0 < |fF|/fW < 7.0,$$

$$\omega W > 170.0 \text{ (degrees), and}$$

$$\omega T > 170.0 \text{ (degrees)},$$

where f1 represents a focal length of the first lens unit, fW represents a shortest focal length of the zoom lens, R1 and R2 represent curvature radii of object-side and image-side lens surfaces of a lens G1 in the first lens unit disposed closest to the object side, respectively, fF represents a focal length of the focus lens unit, $\omega W$ represents an imaging angle of view at the shortest focal length, and $\omega T$ represents an imaging angle of view at a longest focal length.

* * * * *